United States Patent
Shirai et al.

(10) Patent No.: US 11,416,182 B2
(45) Date of Patent: Aug. 16, 2022

(54) INFORMATION PROCESSING APPARATUS, CONTROL METHOD, AND INFORMATION PROCESSING SYSTEM

(71) Applicant: CANON KABUSHIKI KAISHA, Tokyo (JP)

(72) Inventors: Hayato Shirai, Yokohama (JP); Kazunari Shishido, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/193,618

(22) Filed: Mar. 5, 2021

(65) Prior Publication Data
US 2021/0303225 A1 Sep. 30, 2021

(30) Foreign Application Priority Data
Mar. 30, 2020 (JP) .............................. JP2020-061429

(51) Int. Cl.
*G06F 3/12* (2006.01)
*H04L 41/5051* (2022.01)
*H04L 41/5025* (2022.01)
*H04L 41/5009* (2022.01)

(52) U.S. Cl.
CPC .......... *G06F 3/1204* (2013.01); *G06F 3/1219* (2013.01); *G06F 3/1255* (2013.01); *H04L 41/5016* (2013.01); *H04L 41/5025* (2013.01); *H04L 41/5051* (2013.01); *G06F 3/1287* (2013.01)

(58) Field of Classification Search
None
See application file for complete search history.

(56) References Cited

U.S. PATENT DOCUMENTS

| | | | |
|---|---|---|---|
| 2001/0009018 A1* | 7/2001 | Iizuka | G06F 3/1204 709/224 |
| 2018/0203649 A1* | 7/2018 | Ramakrishnan | H04N 1/32545 |
| 2019/0230181 A1* | 7/2019 | Wang | G06F 16/909 |

FOREIGN PATENT DOCUMENTS

JP 2017-047590 3/2017

OTHER PUBLICATIONS

U.S. Appl. No. 17/217,151, filed Mar. 30, 2021.

* cited by examiner

*Primary Examiner* — Frantz Bataille
(74) *Attorney, Agent, or Firm* — Venable LLP (57) ABSTRACT

The present invention provides an information processing apparatus capable of performing appropriate processing under a predetermined usage agreement. To this end, the information processing apparatus repeatedly communicates with a server saving agreement information and obtains the agreement information in a case where the information processing apparatus is in a second state in which a predetermined service is available. In this case, the information processing apparatus switches from the second state to a first state in which the predetermined service is unavailable based on a time and date at which the communication with the server fails.

13 Claims, 9 Drawing Sheets

| TANK TYPE \ AGREEMENT STATE | FIRST STATE | SECOND STATE |
|---|---|---|
| GENERAL TANK | USABLE | USABLE |
| SERVICE TARGET TANK | UNUSABLE | USABLE |

FIG.7A

| TANK TYPE \ AGREEMENT STATE | FIRST STATE | SECOND STATE |
|---|---|---|
| GENERAL TANK | USABLE | UNUSABLE |
| SERVICE TARGET TANK | UNUSABLE | USABLE |

INFORMATION PROCESSING APPARATUS, CONTROL METHOD, AND INFORMATION PROCESSING SYSTEM

BACKGROUND OF THE INVENTION

Field of the Invention

The present invention relates to an information processing apparatus that can receive a service based on an agreement, a control method of the same, and an information processing system.

Description of the Related Art

There is known a method of managing a usage agreement of an information processing apparatus with a management server capable of communicating with the information processing apparatus. Japanese Patent Laid-Open No. 2017-47590 discloses an image printing apparatus that restricts a print operation under a specific usage agreement if a state where the image printing apparatus performs no communication with a server continues for a predetermined period.

SUMMARY OF THE INVENTION

The information processing apparatus is sometimes turned off or enters a power-saving mode with the specific usage agreement left in a concluded state. In this case, in the configuration of Japanese Patent Laid-Open No. 2017-47590, even when the user has not canceled the specific usage agreement, desired processing is sometimes restricted once the information processing apparatus is restarted, and the information processing apparatus cannot receive an appropriate service.

The present invention has been made to solve the aforementioned problem and an object thereof is to provide a technique that allows an appropriate operation under a specific usage agreement.

In a first aspect of the present invention, there is provided an information processing apparatus capable of communicating with a server that saves predetermined agreement information, comprising: a setting unit that sets the information processing apparatus to a first state or a second state based on the agreement information, the first state being a state in which a predetermined service is unavailable, the second state being a state in which the predetermined service is available; and an obtaining unit that repeatedly communicates with the server and obtains the agreement information from the server in a case where the information processing apparatus is set to the second state, wherein the setting unit switches the information processing apparatus from the second state to the first state based on a time and date at which the obtaining unit fails to obtain the agreement information.

In a second aspect of the present invention, there is provided a control method of an information processing apparatus capable of communicating with a server that saves predetermined agreement information, comprising: setting the information processing apparatus to a first state or a second state based on the agreement information, the first state being a state in which a predetermined service is unavailable, the second state being a state in which the predetermined service is available; and repeatedly communicating with the server and obtaining the agreement information from the server in a case where the information processing apparatus is set to the second state, wherein in the setting, the information processing apparatus is switched from the second state to the first state based on a time and date at which obtaining of the agreement information fails in the obtaining step.

In a third aspect of the present invention, there is provided an information processing system including a server that saves predetermined agreement information on an information processing apparatus; and the information processing apparatus that is capable of communicating with the server, the information processing apparatus comprising: a setting unit that sets the information processing apparatus to a first state or a second state based on the agreement information, the first state being a state in which a predetermined service is unavailable, the second state being a state in which the predetermined service is available; and an obtaining unit that repeatedly communicates with the server and obtains the agreement information from the server in a case where the information processing apparatus is set to the second state, and the setting unit switches the information processing apparatus from the second state to the first state based on a time and date at which the obtaining unit fails to obtain the agreement information.

Further features of the present invention will become apparent from the following description of exemplary embodiments with reference to the attached drawings.

DESCRIPTION OF THE EMBODIMENTS

<Schematic Configuration of Printing Apparatus>

Figure 1:
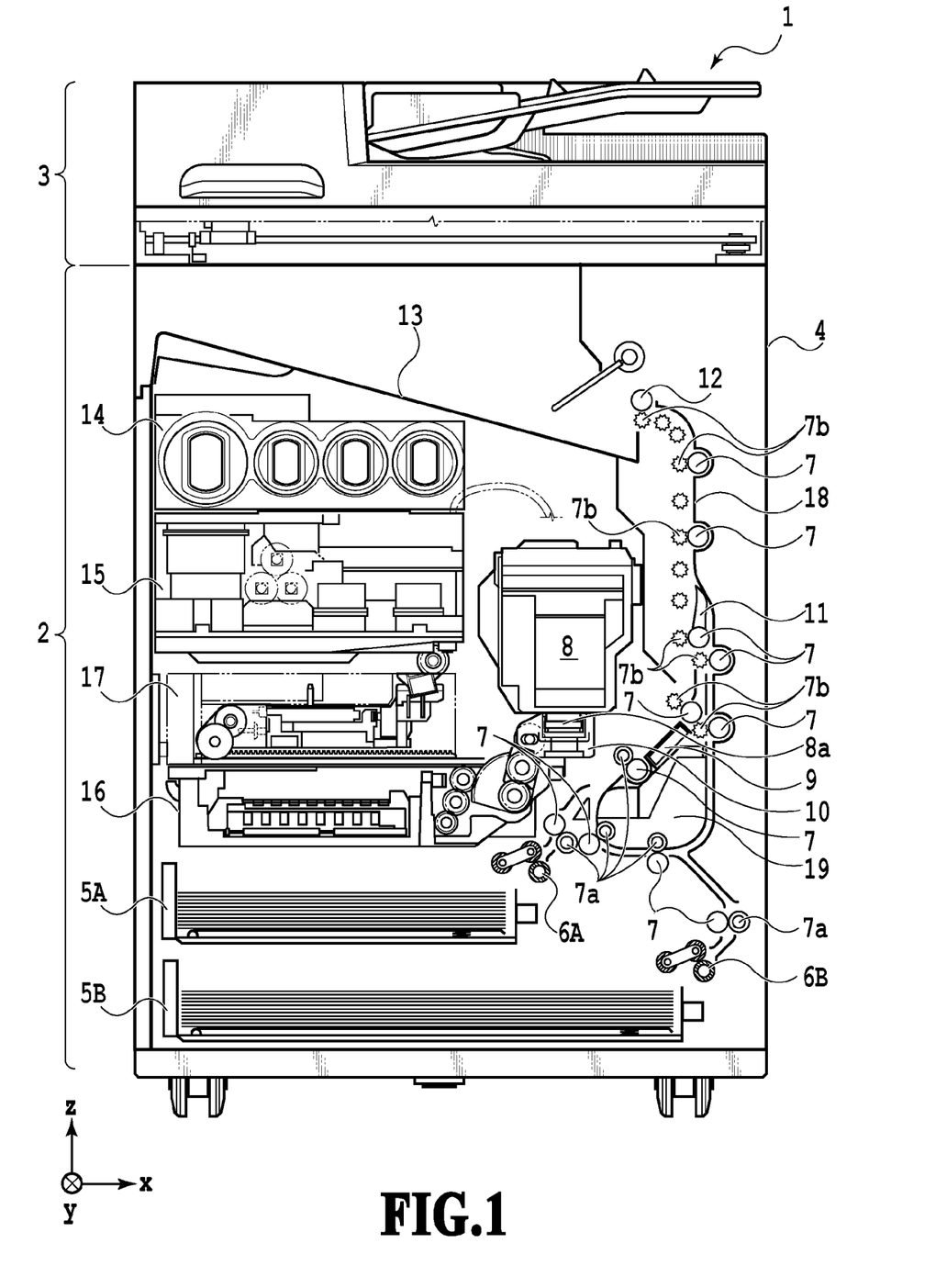
FIG. 1 is an internal configuration diagram of an ink-jet printing apparatus.

FIG. 1 is an internal configuration diagram of an ink-jet printing apparatus 1 (hereinafter, printing apparatus 1) usable as an information processing apparatus of the present invention. In FIG. 1, an x direction is a horizontal direction, a y direction (sheet surface perpendicular direction) is a direction in which ejection ports are aligned in a print head 8, and a z direction is a vertical direction.

The printing apparatus 1 is a multi-function peripheral including a print unit 2 and a scanner unit 3 and the print unit 2 and the scanner unit 3 can execute various processes relating to a printing operation and a reading operation individually or in cooperation. The scanner unit 3 includes an automatic document feeder (ADF) and a flatbed scanner (FBS) and can read originals automatically fed by the ADF and read (scan) an original placed on a document table of the FBS by a user. Although the embodiment is the multi-function peripheral including both of the print unit 2 and the scanner unit 3, a mode including no scanner unit 3 may be employed. FIG. 1 illustrates a standby state where the printing apparatus 1 is performing neither the printing operation nor the reading operation.

A first cassette 5A and a second cassette 5B that contain print media (cut sheets) S are detachably installed in a bottom portion of the print unit 2 on the lower side in the vertical direction. Relatively small print media up to a size of A4 are contained in the first cassette 5A while being stacked one on top of another and relatively large print media up to a size of A3 are contained in the second cassette 5B while being stacked one on top of another. A first feeding unit 6A that separates the contained print media S from one another and feeds the print media S one by one is provided near the first cassette 5A. Similarly, a second feeding unit 6B is provided near the second cassette 5B. In a case where the printing operation is performed, the print media S are selectively fed from one of the cassettes.

Conveyance rollers 7, a discharge roller 12, pinch rollers 7a, spurs 7b, a guide 18, an inner guide 19, and a flapper 11 are a conveyance mechanism that guides the print media S in a predetermined direction. The conveyance rollers 7 are arranged upstream and downstream of the print head 8 and are drive rollers driven by a not-illustrated conveyance motor. The discharge roller 12 is arranged just before a discharging port and is a drive roller driven by the not-illustrated conveyance motor. The pinch rollers 7a are driven rollers that rotate by nipping the print media S before the printing together with the conveyance rollers 7. The spurs 7b rotate by nipping the print media S subjected to the printing together with the conveyance rollers 7 or the discharge roller 12.

The guide 18 is provided in a conveyance path of the print media S and guides the print media S in the predetermined direction. The inner guide 19 has a curved side surface that is a member extending in the y direction, and guides the print media S along this side surface. The flapper 11 is a member that switches the direction in which the print media S are conveyed in a duplex printing operation. A discharge tray 13 is a tray for stacking and holding the print media S for which the printing operation is completed and which are discharged by the discharge roller 12.

The print head 8 of the embodiment is a full-line type color ink-jet print head and multiple ejection ports that eject inks according to print data are aligned in the y direction in FIG. 1, corresponding to the width of the print media S. In a case where the print head 8 is at a standby position, an ejection port surface 8a of the print head 8 is capped by a cap unit 10 as illustrated in FIG. 1. In the printing operation, a print controller 202 to be described later changes the orientation of the print head 8 such that the ejection port surface 8a faces a platen 9. The platen 9 is formed of a flat plate extending in the y direction and supports the print medium S subjected to the printing operation by the print head 8, from the back side.

An ink tank unit 14 stores inks of four colors to be supplied to the print head 8. An ink supply unit 15 is provided in the middle of channels connecting the ink tank unit 14 and the print head 8 and adjusts the pressure and flow rate of each ink in the print head 8 to appropriate ranges. In the embodiment, a circulation ink supply system is employed and the ink supply unit 15 adjusts the pressure of each ink supplied to the print head 8 and the flow rate of the ink collected from the print head 8 to the appropriate ranges.

A maintenance unit 16 includes the cap unit 10 and a wiping unit 17 and activates these units at predetermined timing to perform a maintenance operation on the print head 8. The maintenance operation is described in detail later.

Figure 2:
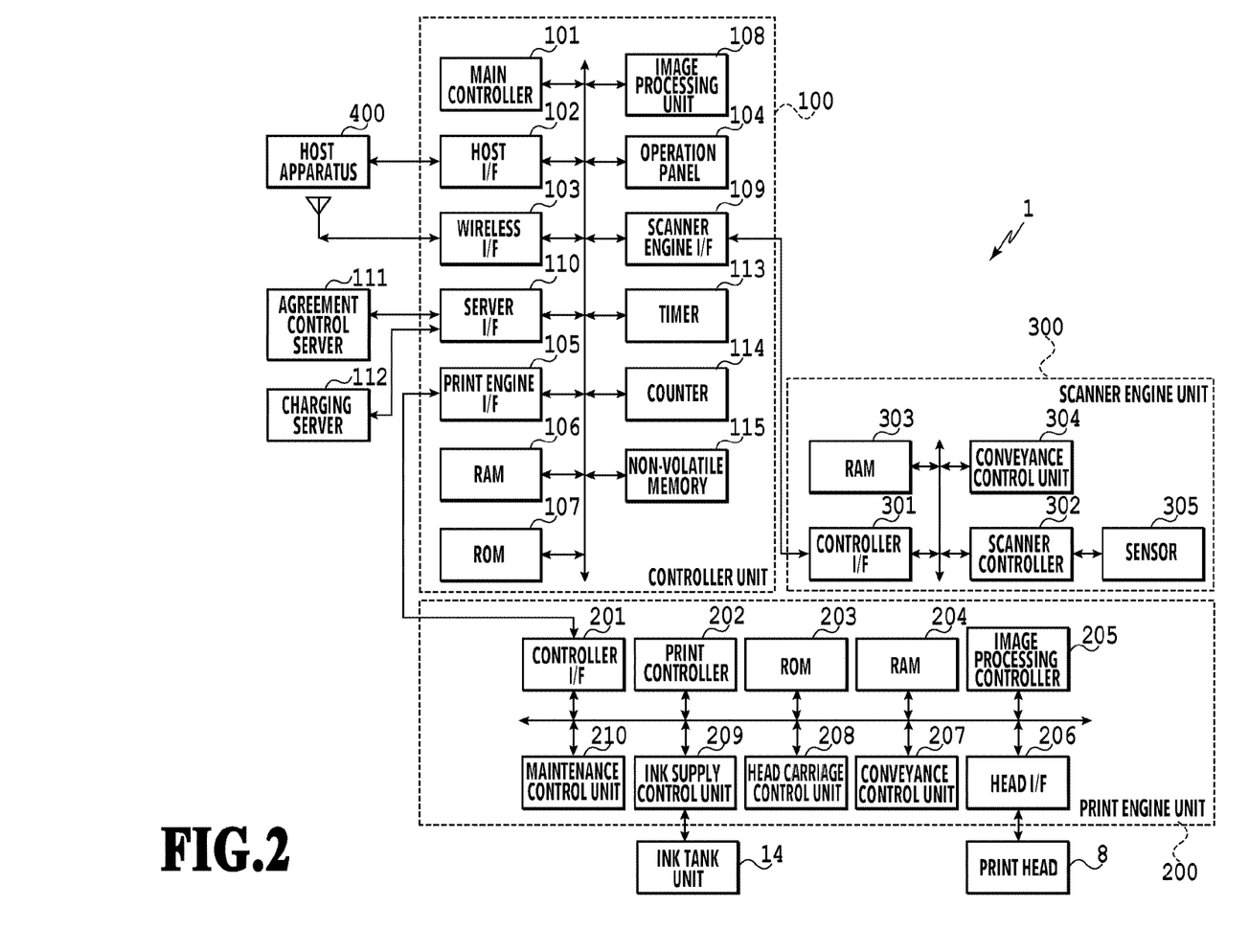
FIG. 2 is a block diagram illustrating a control configuration of the printing apparatus.

FIG. 2 is a block diagram illustrating a control configuration in the printing apparatus 1. The control configuration is formed of a print engine unit 200 that mainly controls the entire print unit 2, a scanner engine unit 300 that controls the entire scanner unit 3, and a controller unit 100 that controls the entire printing apparatus 1. The print controller 202 controls various mechanisms of the print engine unit 200 according to instructions of a main controller 101 in the controller unit 100. The main controller 101 in the controller unit 100 controls various mechanisms of the scanner engine unit 300. Details of the control configuration are described below.

In the controller unit 100, the main controller 101 formed of a central processing unit (CPU) controls the entire printing apparatus 1 according to a program and various parameters stored in a read only memory (ROM) 107 while using a random access memory (RAM) 106 as a work area. For example, in a case where the main controller 101 receives a print job from a host apparatus 400 via a host interface (I/F) 102 or a wireless I/F 103, an image processing unit 108 performs predetermined image processing on the received image data according to an instruction of the main controller 101. Then, the main controller 101 sends the image data subjected to the image processing to the print engine unit 200 via a print engine I/F 105. Moreover, for example, in a case where the main controller 101 receives a read command from the host apparatus 400, the main controller 101 sends this command to the scanner unit 3 via a scanner engine I/F 109.

Note that the printing apparatus 1 may obtain the image data from the host apparatus 400 through wireless communication or wired communication or obtain the image data from an external storage apparatus (USB memory or the like) connected to the printing apparatus 1. Communication methods used in the wireless communication and the wired communication are not limited to certain methods. For example, Wireless Fidelity (Wi-Fi) (registered trademark) and Bluetooth (registered trademark) can be applied as the communication method used in the wireless communication. Moreover, Universal Serial Bus (USB) and the like can be applied as the communication method used in the wired communication.

A server I/F 110 is an interface used to connect the printing apparatus 1 to the Internet. The main controller 101 exchanges information with an agreement control server 111 and a charging server 112 via the server I/F 110.

An operation panel 104 is a mechanism used by the user to perform input and output on the printing apparatus 1. The user can instruct the printing apparatus 1 to perform operations such as copying and scanning, set a print mode, set and update agreement information of the printing apparatus 1 through the operation panel 104.

A timer 113 manages current time. A counter 114 counts the number of images printed by the printing apparatus 1 in each of a color mode and a monochrome mode. Count values obtained by the counter 114, state information of the printing apparatus to be described later, and the like are saved as necessary in a non-volatile memory 115.

In the print engine unit 200, the print controller 202 formed of a CPU controls various mechanisms included in the print unit 2 according to a program and various parameters stored in a ROM 203, under an instruction of the main controller 101. In this case, the print controller 202 uses a RAM 204 as a work area.

For example, in a case where the print controller 202 receives various commands and image data via a controller I/F 201, the print controller 202 saves the various commands and the image data temporarily in the RAM 204. The print controller 202 causes an image processing controller 205 to convert the saved image data to print data and this enables the image data to be used by the print head 8 in the printing operation.

After the generation of the print data, the print controller 202 causes the print head 8 to execute the printing operation based on the print data via a head I/F 206. In this case, the print controller 202 drives the feeding units 6A, 6B, the conveyance rollers 7, the discharge roller 12, and the flapper 11 illustrated in FIG. 1 via a conveyance control unit 207 to convey the print media S. The printing operation by the print head 8 is executed along with the conveyance operation of the print media S according to an instruction of the print controller 202 and the print processing is performed.

A head carriage control unit 208 changes the orientation and position of the print head 8 depending on an operation state such as a maintenance state and a printing state of the printing apparatus 1. An ink supply control unit 209 controls the ink supply unit 15 such that the pressure of the ink supplied to the print head 8 is within an appropriate range. A maintenance control unit 210 controls operations of the cap unit 10 and the wiping unit 17 in the maintenance unit 16 in a case where the maintenance operation is performed on the print head 8.

In the scanner engine unit 300, the main controller 101 controls a hardware resource of a scanner controller 302 according to the program and the various parameters stored in the ROM 107 while using the RAM 106 as a work area. The various mechanisms included in the scanner unit 3 are thereby controlled. For example, the main controller 101 controls the hardware resources in the scanner controller 302 to convey the originals mounted on the ADF by the user through a conveyance control unit 304 and read the originals with a sensor 305. Then, the scanner controller 302 saves the read image data in a RAM 303. Note that the print controller 202 converts the obtained image data to the print data as described above and this allows the print head 8 to execute the printing operation based on the image data read in the scanner controller 302.

Figure 3:
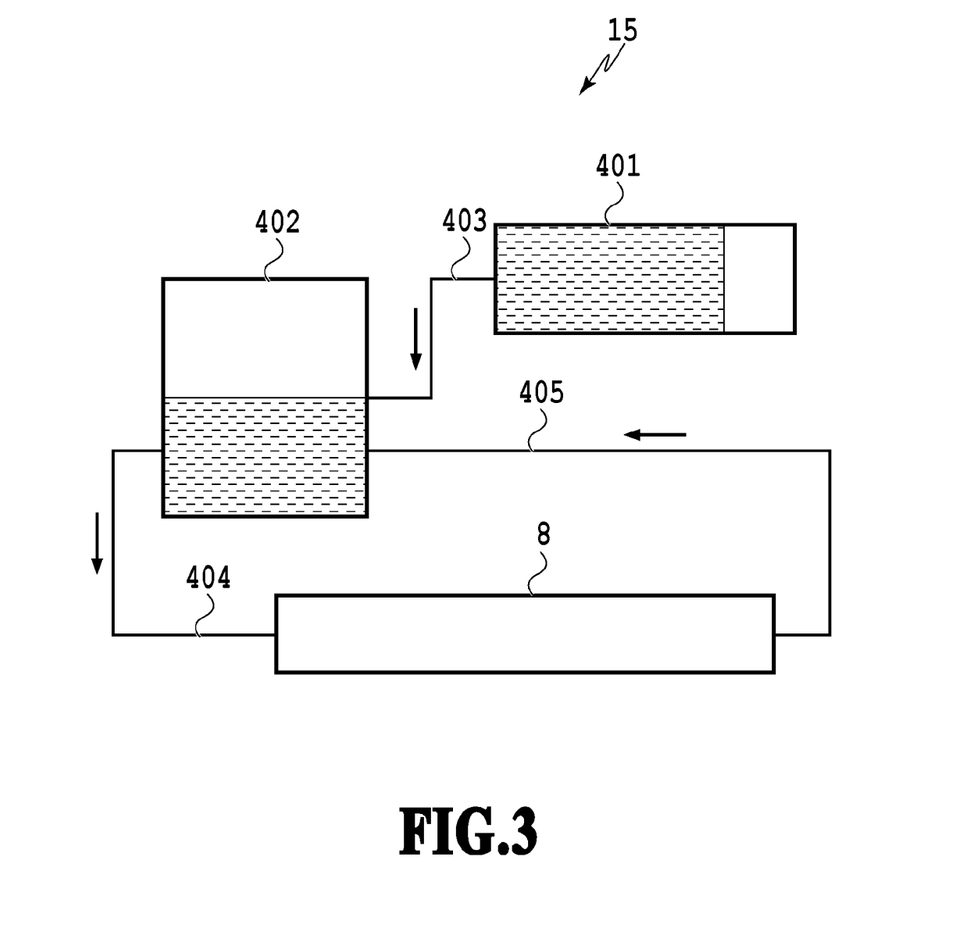
FIG. 3 is a diagram schematically illustrating a configuration of an ink supply unit.

FIG. 3 is a diagram schematically illustrating a configuration of the ink supply unit 15 (see FIG. 1) in the printing apparatus 1. The ink supply unit 15 supplies the ink supplied from a main tank 401 attached to the ink tank unit 14 to the print head 8 while causing the ink to circulate at appropriate pressure. Although the configuration for an ink of one color is illustrated in FIG. 3, the same configuration is provided for each ink color in the printing apparatus 1.

The ink supply unit 15 includes a sub tank 402, a connection channel 403, a supply channel 404, and a collecting channel 405. The sub tank 402 is a tank that temporarily receives the ink to be supplied to the print head 8 and is connected to the print head 8 via the supply channel 404 and the collecting channel 405. The ink circulates from the sub tank 402 to the supply channel 404, to the print head 8, to the collecting channel 405 and returns to the sub tank 402. During the aforementioned circulation, the print head 8 ejects the ink according to the print data.

Performing such ink circulation control allows fresh ink to be stably supplied to the print head 8. As a result, it is possible to stabilize the ejection operation of the print head 8 and maintain quality of an outputted image at a high level.

The amount of received ink in the sub tank 402 gradually decreases with the printing operation. Accordingly, in a case where the amount of received ink in the sub tank 402 reaches or falls below a predetermined value, the print controller 202 (see FIG. 2) drives a not-illustrated pump at predetermined timing and reduces the pressure inside the sub tank 402. The sub tank 402 is thereby replenished with the ink from the main tank 401 connected to the sub tank 402 by the connection channel 403. The main tank 401 whose ink is consumed is removed from the ink tank unit 14 and the user can replace it with a new main tank 401. The print controller 202 performs such sub tank replenishment processing as a preparation stage of the printing apparatus 1 before the reception of the print job, as appropriate.

In the embodiment, the main controller 101 controls the aforementioned ink circulation and the printing operation by the print head 8 based on a conclusion state of a usage agreement of the printing apparatus 1.

<Outline of Usage Agreement>

The printing apparatus 1 of the embodiment can receive a specific service under a subscription agreement. Contents of the subscription agreement are not limited to particular contents. In the embodiment, the subscription agreement is assumed to be an agreement in which a main tank being a target of service (hereinafter, referred to as service target tank) is available for printing of up to a predetermined number of sheets by paying a monthly flat-rate charge. The service target tank is a main tank allowed to be used only in a case where the subscription agreement is concluded. Moreover, the service target tank is the same type of tank as the general main tank (hereinafter, referred to as general tank) and both tanks can be attached to the ink tank unit 14 of the printing apparatus 1. Note that a tank memory is attached to each of the main tanks and stores information such as information indicating whether the tank is the service target tank or the general tank and information on the color of the contained ink. Accordingly, the main controller 101 can determine whether the attached tank is the general tank or the service target tank by reading the information stored in the tank memory.

Figure 4A:
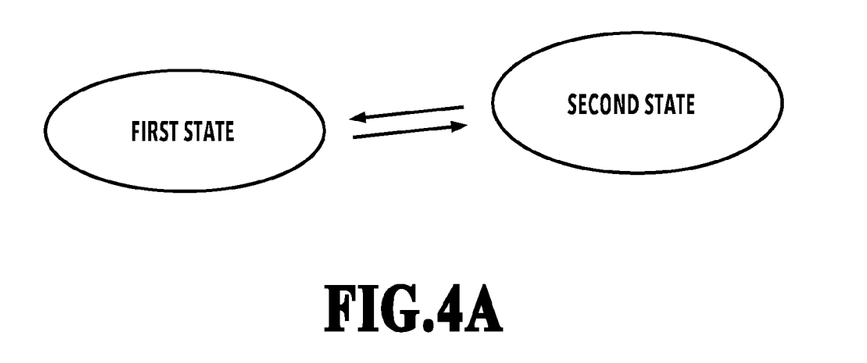
FIGS. 4A and 4B illustrate states of the printing apparatus and a concept view of an information processing system.

FIG. 4A illustrates a state of the printing apparatus 1 based on the subscription agreement. In the embodiment, in a case where the subscription agreement is not concluded, the printing apparatus 1 is assumed to be in a first state in which the service is unavailable. Meanwhile, in a case where the subscription agreement is concluded, the printing apparatus 1 is assumed to be in a second state in which the service is available. At the moment where the printing apparatus 1 is shipped, the printing apparatus 1 is in the first state. Then, if the user concludes the subscription agreement, the state of the printing apparatus 1 is switched from the first state to the second state. The user can switch the printing apparatus 1 between the first state and the second state by concluding or cancelling the subscription agreement. Moreover, in a case where the user has not canceled the subscription agreement but a state in which the printing apparatus 1 cannot communicate with the servers continues for a predetermined period, a service provider cannot manage the usage state of the printing apparatus 1. Accordingly, the printing apparatus 1 of the embodiment is switched from the second state to the first state. The aforementioned state of the printing apparatus 1 is required to be appropriately set to allow the user to receive an appropriate service matching the agreement.

Figure 4B:
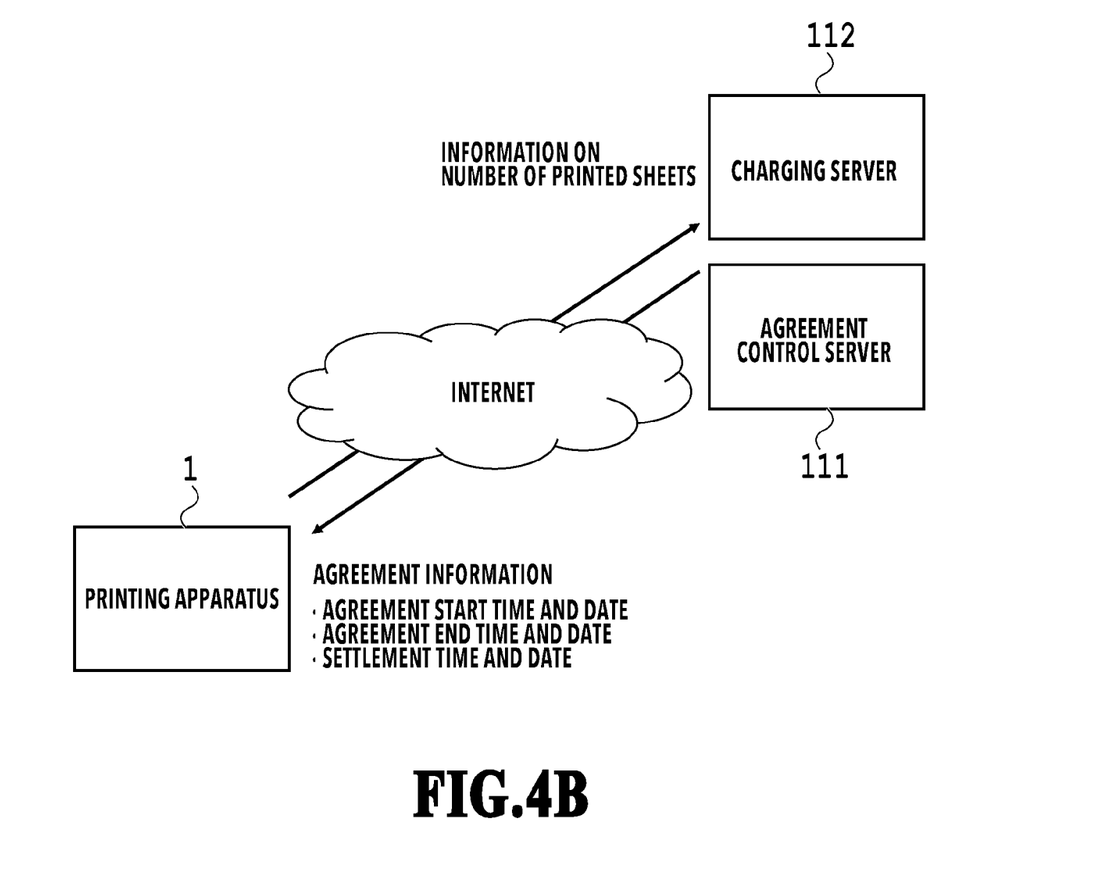

FIG. 4B is a diagram illustrating an information processing system of the embodiment. In the embodiment, the agreement control server 111 and the charging server 112 connected to the printing apparatus 1 via the Internet manage the subscription agreement of the printing apparatus 1. The main controller 101 of the printing apparatus 1 periodically receives agreement information of the printing apparatus 1 from the agreement control server 111 and saves the agreement information in the non-volatile memory 115 (see FIG. 2). The received agreement information includes an agreement start time and date, an agreement end time and date, a monthly settlement date, and the like. Moreover, the main controller 101 can obtain a current time and date from the agreement control server 111 as necessary. The format of the current time and date is in compliant with ISO8601 (yyyy-MM-ddTHH:mm:ssZ). Employing the mode in which the current time and date is obtained from the agreement control server 111 allows time to be uniformly managed among all printing apparatuses 1 connected to the server. Although the expressions of "agreement start time and date", "agreement end time and date", and "settlement time and date" are used in the description, in the embodiment, these pieces of information do not have to necessary include information on time. In other words, these pieces of information may include information only on year, month, and date.

Meanwhile, the main controller 101 of the printing apparatus 1 periodically sends information on the number of sheets printed by the printing apparatus 1 and information on a remaining inks mount to the charging server 112. In this case, the information on the number of printed sheets includes the number of sheets printed in the color mode and the number of sheets printed in the monochrome mode in a predetermined period. The charging server 112 compares the number of printed sheets with the contents of agreement and performs charging processing depending on the agreement. For example, in a case where the number of printed sheets is equal to or less than a defined value in a state where the subscription agreement concluded, the charging server 112 charges the monthly flat-rate charge. In a case where the number of printed sheets exceeds the defined value, the charging server 112 charges an excess charge in addition to the flat-rate charge. Moreover, the charging server 112 infers whether delivery of the main tank to be described later is necessary or not based on the received information on the remaining ink amount.

Figure 5:
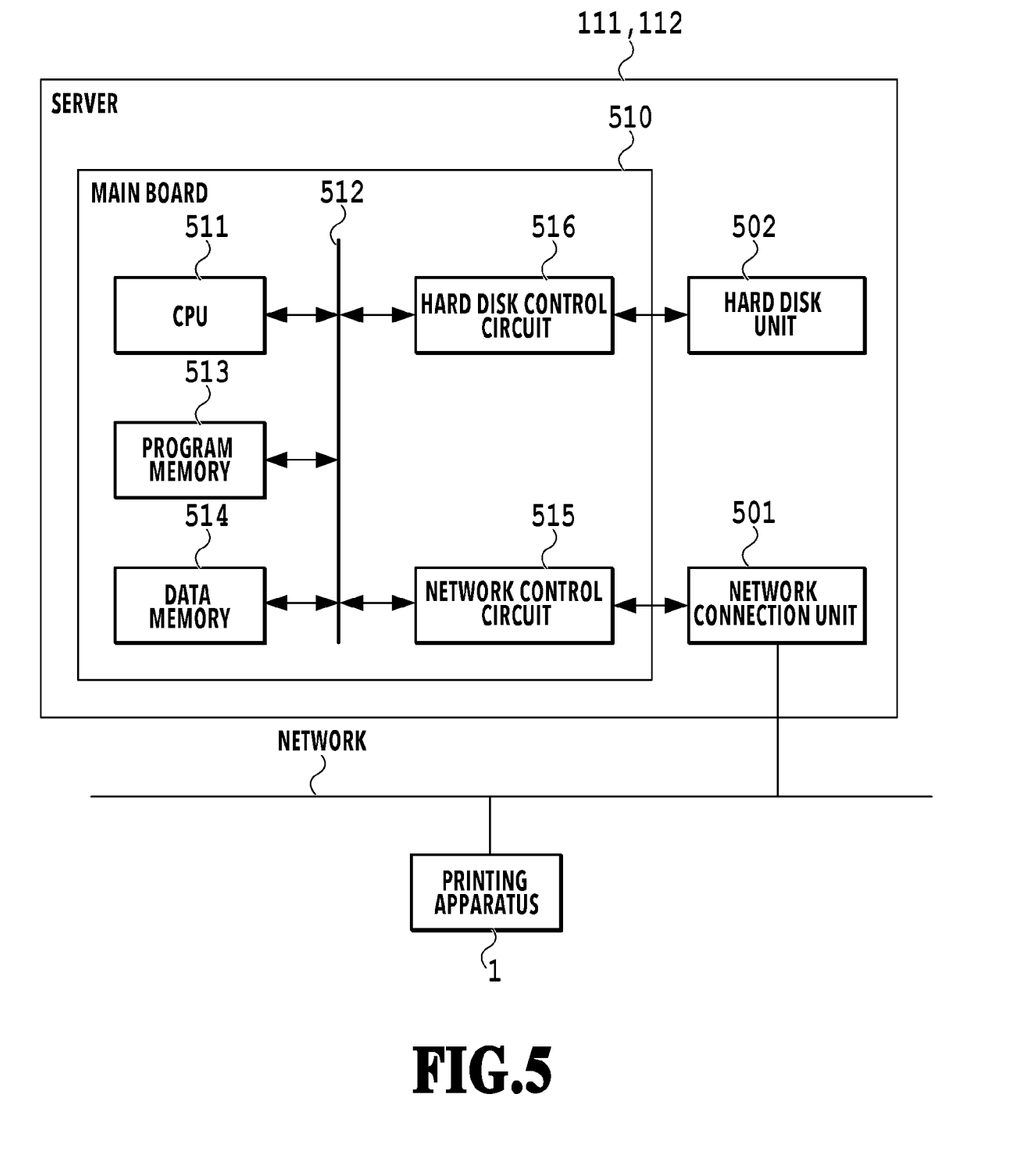
FIG. 5 is a block diagram illustrating a configuration of a server.

FIG. 5 is a block diagram illustrating a configuration of the agreement control server 111 and the charging server 112. In FIG. 5, the same hardware configuration is assumed to be used for the agreement control server 111 and the charging server 112. Hereinafter, the agreement control server 111 and the charging server 112 are simply referred to as servers 111, 112 for the sake of convenience. Each of the servers 111, 112 includes a network connection unit 501, a hard disk unit 502, and a main board 510 that controls the entire apparatus. The main board 510 includes a CPU 511, an internal bus 512, a program memory 513, a data memory 514, a network control circuit 515, and a hard disk control circuit 516. Although the system example in which the agreement control server 111 performs the agreement management and the charging server 112 performs the charging management and the delivery management is described in the example, the embodiment is not limited to this system example. For example, one server may perform functions of managing all of agreement, charging, and delivery. Alternatively, three or more servers may perform the functions of managing agreement, charging, and delivery in cooperation. A configuration including one or more servers is referred to as a server system and, in this embodiment, the server system is assumed to manage agreement, charging, and delivery.

The CPU 511 in a microprocessor form arranged in the main board 510 operates according to contents of the data memory 514 and a control program stored in the program memory 513 connected to the CPU 511 via the internal bus 512. The CPU 511 connects to the Internet by controlling the network connection unit 501 via the network control circuit 515 and communicates with one or more printing apparatuses 1 and other servers. The CPU 511 can read data from and write data to the hard disk unit 502 connected to the CPU 511 via the hard disk control circuit 516. An operating system and control software of the server 111, 112 used by being loaded onto the program memory 513 are stored in the hard disk unit 502 in addition to various pieces of data.

In the case of the agreement control server 111, the agreement start time and date and the agreement end time and date of the printing apparatus 1 and the like are stored in the data memory 514 in a rewritable manner. In a case where the server 111 receives a request for the agreement information from the printing apparatus 1, the CPU 511 sends the printing apparatus 1 the information on the agreement start time and date and the agreement end time and date saved in the data memory 514, via the network connection unit 501. In the case of the charging server 112, the number of sheets printed by the printing apparatus 1 and the like are saved in the data memory 514 in a rewritable manner. In a case where the charging server 112 receives the information on the number of printed sheets from the printing apparatus 1, the CPU 511 saves the information received via the network connection unit 501 in the data memory 514.

Figure 6A:
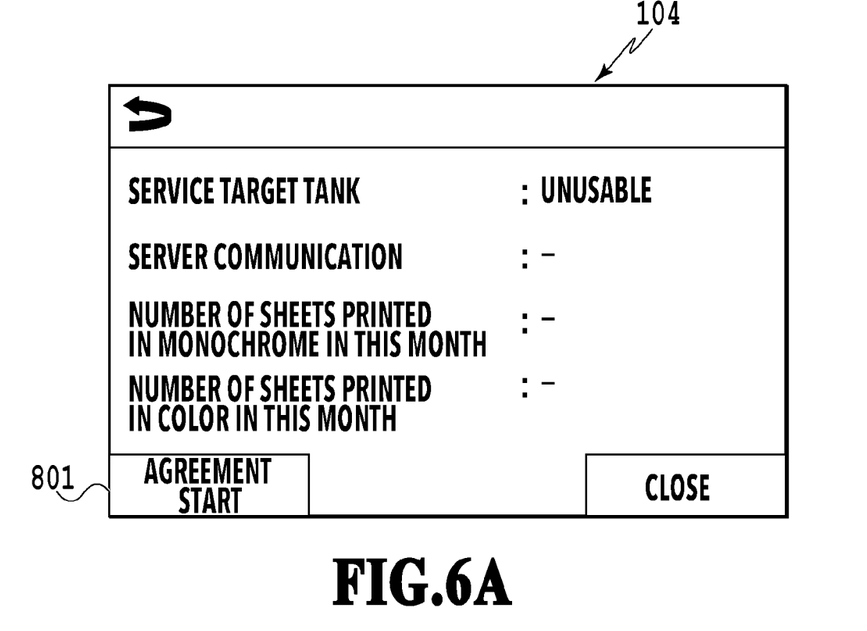
FIGS. 6A and 6B are views illustrating a display screen of an operation panel.
Figure 6B:
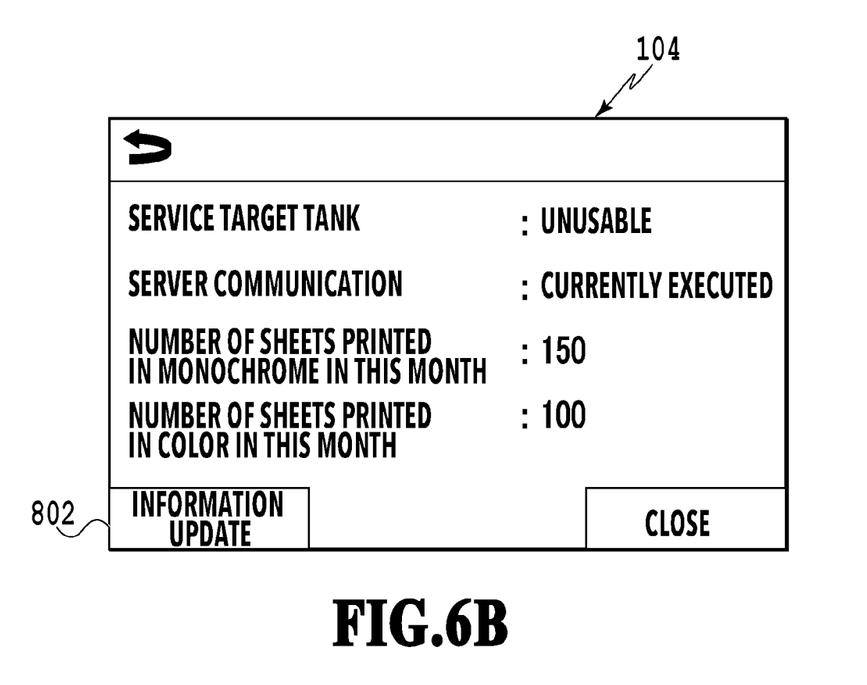

FIGS. 6A and 6B are views illustrating a display screen of the operation panel 104 used by the user to conclude the subscription agreement and check the agreement state in the printing apparatus 1. FIG. 6A illustrates the display screen in a case where the printing apparatus 1 is in the first state and FIG. 6B illustrates the display screen in a case where the printing apparatus 1 is in the second state.

In a case where the printing apparatus 1 is in the first state, that is the subscription agreement is not concluded, as illustrated in FIG. 6A, notices such as a notice indicating that the service target tank cannot be used and a notice indicating that communication with the servers is not performed are displayed on the operation panel 104. In a case where the user presses an agreement start button 801 in a lower left portion of the screen, the printing apparatus 1 starts obtaining the agreement information from the agreement control server 111. Note that, in this case, a separate subscription agreement is assumed to be concluded between the user and the service provider (sales company of the printer) in advance. Moreover, the agreement information (agreement start time and date, agreement end time and date, and the like) is assumed to be stored in the data memory 514 (see FIG. 5) of the agreement control server 111 based on the agreement contents. Thus, the printing apparatus 1 can obtain the agreement information by the pressing of the agreement start button 801. In other words, the agreement start button 801 in this case can be also referred to as a communication start button.

Note that the method of agreement is not limited to the aforementioned method. For example, the subscription agreement may be concluded by an operation on the printing apparatus 1 even if there is no agreement concluded between the user and the service provider in advance. In this case, for example, pressing of the agreement start button 801 by the user causes the display screen to switch to a screen for agreement and the user can conclude the subscription agreement through the operation panel 104. The conclusion information of the subscription agreement is sent to the agreement control server 111 and the agreement control server 111 saves the agreement start time and date, the agreement end time and date, and the like in the data memory 514 (see FIG. 5) according to the received information.

As described above, the agreement control server 111 sends the printing apparatus 1 the agreement start time and date and the agreement end time and date saved in the data memory 514 as necessary. The printing apparatus 1 is thereby switched from the first state to the second state. Note that the agreement end date is not necessarily decided depending on the user. In a case where the agreement end date is undecided, use of the following modes are conceivable: a mode in which the information on the agreement end date is not set; and a mode in which a time and date so far in the future that the agreement end date can be assumed to be substantially undecided is set as "temporal agreement end date". In the latter mode, for example, a date and time 100 years later from the current time and date is inputted as the "temporal agreement end date" and the agreement end date is thereby assumed be substantially undecided. Accordingly, in a case where the agreement end date is undecided, in the former mode, information indicating that the agreement end date is undecided is stored in the memory 514 and, in the latter mode, a time and date in far future is stored in memory 514. Since the setting of the agreement end date, though a formality, is performed in the latter mode, this mode is preferable in terms of security.

In a case where the printing apparatus 1 is in the second state, that is the subscription agreement is concluded, a screen illustrated in FIG. 6B is displayed on the operation panel 104. Specifically, there are displayed a notice indicating that the service target tank can be used, a notice indicating that the communication with the servers is performed, the number of sheets printed in the monochrome mode in this month, and the number of sheets printed in the color mode in this month. Pressing of an information update button 802 in a lower left portion of the screen by the user causes the main controller 101 to access the agreement control server 111 to obtain the latest information and update the display contents of the operation panel 104 based on the obtained information.

Figure 7A:
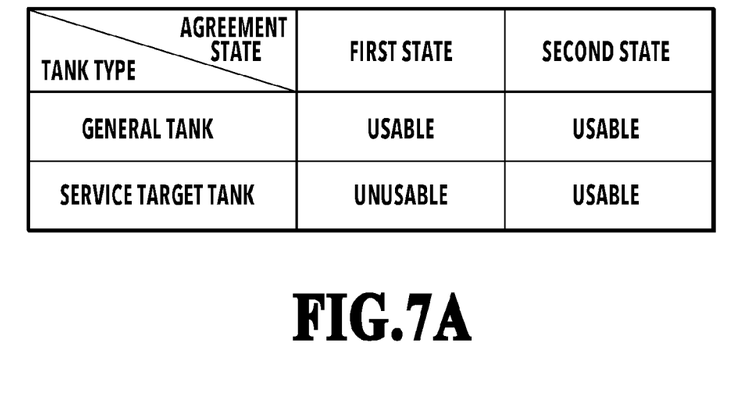
FIGS. 7A and 7B are diagrams illustrating a usable/unusable state depending on an agreement state and the type of the main tank.
Figure 7B:
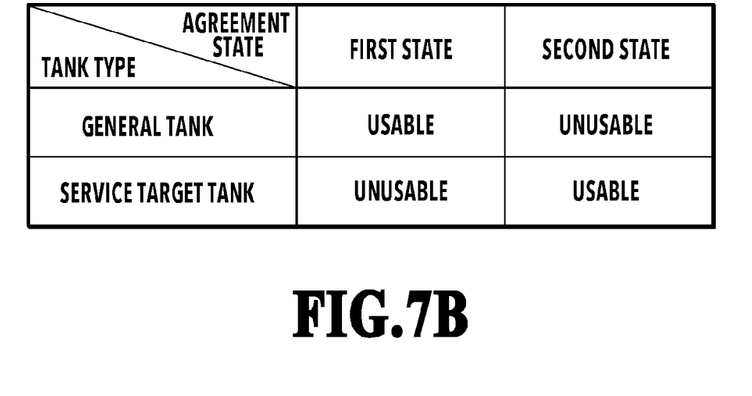

FIGS. 7A and 7B are diagrams illustrating an example of usage conditions of the main tank. FIG. 7A illustrates a usage condition in which the general tank and the service target tank are usable in the state where the subscription agreement is concluded and only the general tank is usable in the state where the subscription agreement is not concluded. Meanwhile, FIG. 7B illustrates a usage condition in which only the service target tank is usable in the state where the subscription agreement is concluded and only the general tank is usable in the state where the subscription agreement is not concluded. As described above, the main controller 101 of the embodiment determines whether to allow the use of each of the attached main tanks based on whether the printing apparatus 1 is in the first state or the second state and whether the main tank is the general tank or the service target tank. Then, if the main controller 101 determines that the attached main tank is not usable, the main controller 101 adds restrictions to the ink circulation, the printing operation, and the like described in FIG. 3. Although either of the usage condition of FIG. 7A or the usage condition of FIG. 7B can be employed in the embodiment, description is given below of an example in which the usage condition of FIG. 7A is employed.

For example, in a case where the ink amount in the sub tank 402 described in FIG. 4 reaches or falls below the predetermined value, the main controller 101 causes the print controller 202 to replenish the sub tank 402 with the ink from the main tank 401 in a case where the main tank 401 is usable. However, in a case where the main tank 401 is not usable, the main controller 101 does not cause the print controller 202 to replenish the sub tank 402 with the ink from the main tank 401. Moreover, in a case where the printing apparatus 1 receives the print job, the main controller 101 transmits the received print job to the print engine unit 200 in a case where the main tank 401 is usable. However, in a case where the main tank 401 is not usable, the main controller 101 does not send the received print job to the print engine unit 200.

<State Setting Sequence of Printing Apparatus>

The state of the printing apparatus 1 needs to be appropriately set to appropriately provide the service based on the subscription agreement. Accordingly, in the embodiment, in a case where the printing apparatus 1 is in the second state, the main controller 101 periodically accesses the agreement control server 111 and obtains the agreement information (see FIG. 4B). Then, if such communication with the server fails, the main controller 101 saves the time and date of the failure and determines whether to switch the printing apparatus 1 from the second state to the first state by using the saved time and date as a starting time and date.

Figure 8:
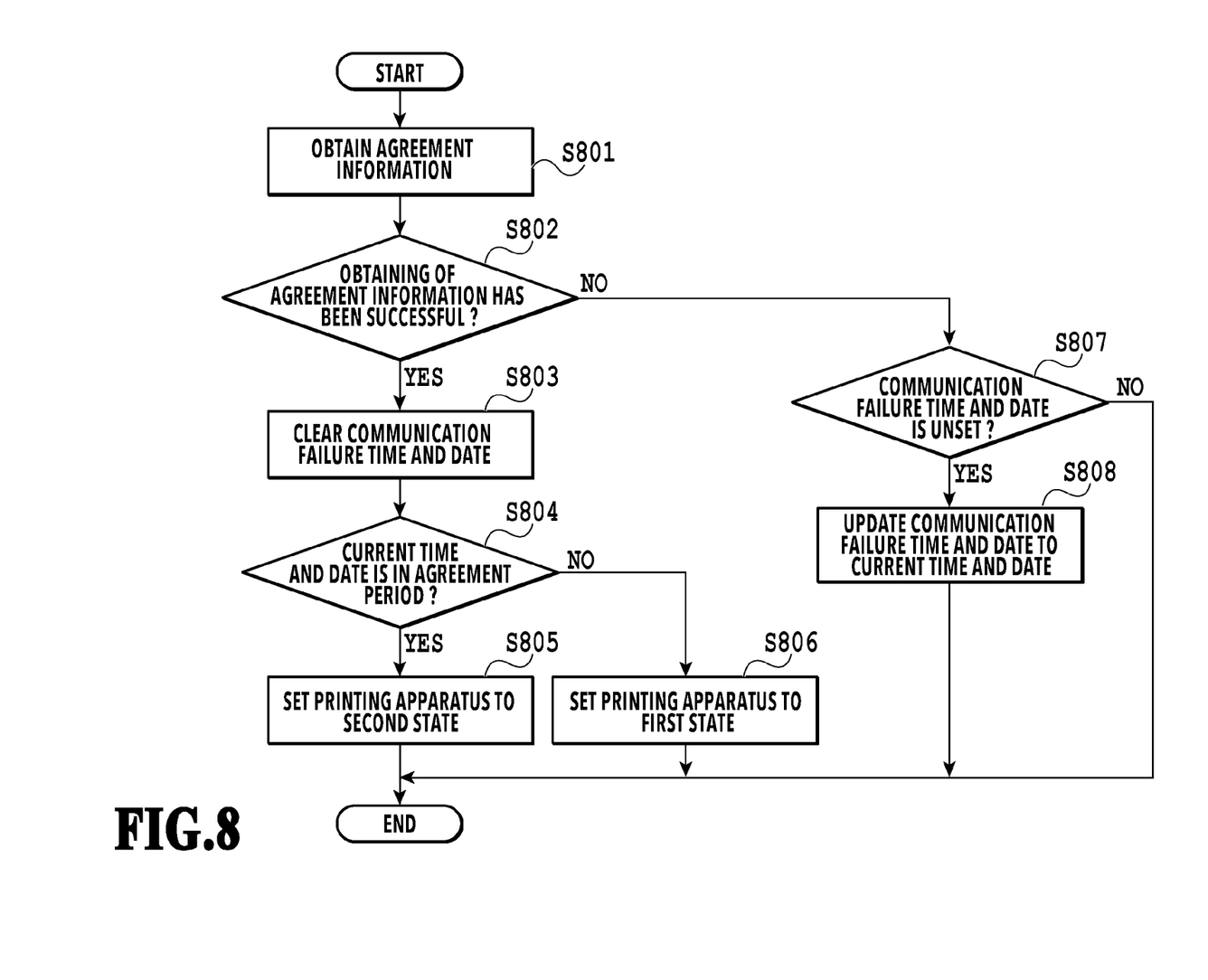
FIG. 8 is a flowchart for explaining a state setting sequence.

FIG. 8 is a flowchart for explaining a state setting sequence performed by the main controller 101. The main controller 101 periodically and repeatedly performs this processing according to the program stored in the ROM 107 while using the RAM 106 as the work area in a case where the printing apparatus 1 is in the second state. Moreover, the main controller 101 executes this processing also in a case where a certain operation relating to the subscription agreement is performed on the operation panel 104.

In a case where this processing is started, in S801, the main controller 101 first obtains the agreement information from the agreement control server 111. Specifically, the main controller 101 accesses the agreement control server 111 and obtains the agreement start time and date and the agreement end time and date saved in the agreement control server 111 as well as the current time and date.

In S802, the main controller 101 determines whether the obtaining of the agreement information in S801 has been successful or has failed. In a case where the obtaining has been successful, the main controller 101 proceeds to S803 and clears (deletes) the communication failure time and date saved in the non-volatile memory 115.

In S804, the main controller 101 refers to the agreement start time and date, the agreement end time and date, and the current time and date obtained in S801 and determines whether the current time and date is included in a period between the agreement start time and date and the agreement end time and date. Then, in a case where the current time and date is included in the period, the main controller 101 proceeds to S805 and sets the printing apparatus 1 to the second state. Specifically, the main controller 101 writes information indicating that the printing apparatus 1 is in the second state, in a state information region of the non-volatile memory 115.

Meanwhile, in a case where the current time and date is not included in the period between the agreement start time and date and the agreement end time and date, the main controller 101 proceeds to S806 and sets the printing apparatus 1 to the first state. Specifically, the main controller 101 writes information indicating that the printing apparatus 1 is in the first state, in the state information region of the non-volatile memory 115.

In a case where the main controller 101 determines that the obtaining of the agreement information has failed in S802, the main controller 101 proceeds to S807 and determines whether the communication failure time and date is unset in the non-volatile memory 115. In a case where the communication failure time and date is unset, the main controller 101 proceeds to S808 and saves the current time and date as the communication failure time and date in the non-volatile memory 115. Meanwhile, in a case where the main controller 101 determines that the communication failure time and date is already set in the non-volatile memory 115 in S807, this processing is terminated.

Figure 9:
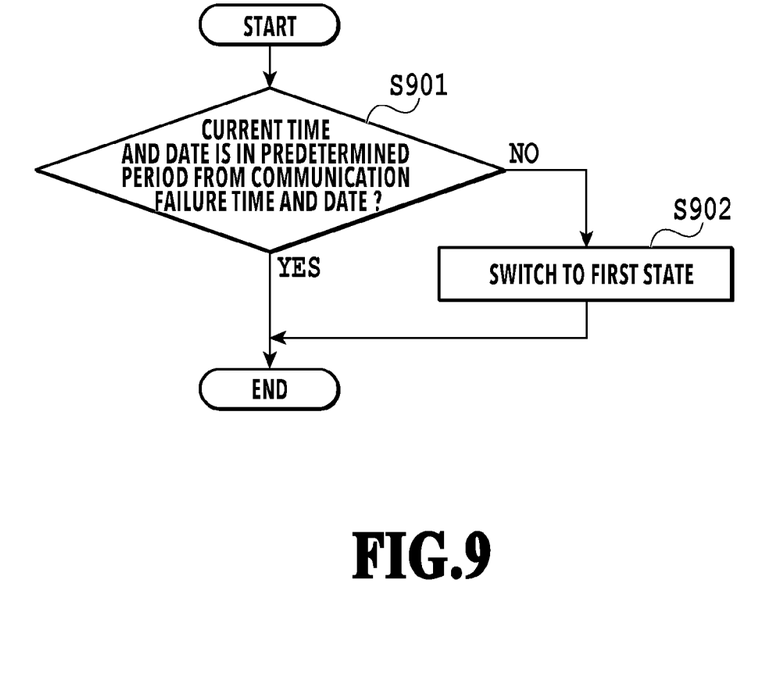
FIG. 9 is a flowchart for explaining state setting based on a communication failure time and date.

FIG. 9 is a flowchart for explaining a step in which the main controller 101 performs state setting based on the communication failure time and date. The main controller 101 periodically performs this processing according to the program stored in the ROM 107 while using the RAM 106 as the work area in a case where the printing apparatus 1 is in the second state. This processing is repeatedly performed independent of the state setting sequence described in FIG. 8, at a cycle shorter than that of the state setting sequence.

In a case where this processing is started, in S901, the main controller 101 determines whether the current time and date managed by the printing apparatus is included in a predetermined period from the communication failure time and date stored in the non-volatile memory 115. Then, in a case where the current time and date is included in the predetermined period from the communication failure time and date, the main controller 101 terminates this processing while maintaining the printing apparatus 1 in the second state.

Meanwhile, in a case where the main controller 101 determines that the current time and date is not included in the predetermined period from the communication failure time and date in S901, the main controller 101 proceeds to S902, switches the printing apparatus 1 from the second state to the first state, and terminates this processing.

The communication between the printing apparatus 1 and the agreement control server 111 sometimes fails due to circumstances in the agreement control server 111. For example, the case where maintenance processing of the agreement control server 111 is performed and similar cases correspond to this case. However, in the configuration in which the printing apparatus 1 periodically or repeatedly accesses the agreement control server 111 as in the embodiment, even if the communication failure consecutively occurs several times, the successful communication can be achieved after attempting the access several times. Then, the main controller 101 can obtain the agreement information and appropriately set the state of the printing apparatus 1 based on the obtained agreement period.

As described above, in the embodiment, processing of determining the state of the printing apparatus 1 is performed not based on the period in which no communication is performed between the printing apparatus 1 and the agreement control server 111 but based on the time elapsed from the time and date of the first communication failure. Accordingly, even after a long period of no communication between the printing apparatus 1 and the server, the printing apparatus 1 in the second state is not switched to the first state contrary to the intention of the user as long as the current date and time is within the agreement period. As a result, the user can start desired print processing without setting the agreement again even after, for example, a long vacation.

As described above, according to the embodiment, it is possible to appropriately set the state of the printing apparatus 1 based on the set agreement period and provide an appropriate service to the user.

(Other Embodiments)

Description is given above of the mode in which the agreement control server 111 and the charging server 112 have independent functions and the printing apparatus 1 communicates with both servers. However, the agreement control server 111 and the charging server 112 may be one server having the functions of both servers. Alternatively, a server system including one or more servers may perform the functions of both servers.

Moreover, description is given above of the case where the ink-jet printing apparatus 1 is used as the information processing apparatus. However, the information processing apparatus may be an image printing apparatus that uses a coloring material other than the ink. For example, in a case where the subscription agreement is concluded with an image printing apparatus that uses toner as the color material being the information processing apparatus, a specific toner cartridge (container containing the toner) may be made usable.

Moreover, the information processing apparatus may be an apparatus other than the printing apparatus as long as the information processing apparatus is capable of commutating with the server saving the predetermined agreement information. In this case, the contents of the service based on the subscription agreement are not limited to particular contents and the information processing apparatus only needs to send the charging server a processing amount of processing unique to the information processing apparatus instead of the print processing in the aforementioned embodiment. Any apparatus can function as the information processing apparatus of the present invention as long as the apparatus is an information processing apparatus capable of communicating with the server saving the predetermined agreement information and is an apparatus capable of providing a certain service depending on the agreement conclusion state.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-061429 filed Mar. 30, 2020, which is hereby incorporated by reference wherein in its entirety.

What is claimed is:

1. An information processing apparatus capable of communicating with a server that saves predetermined agreement information, comprising:
    an obtaining unit that executes an obtaining process for obtaining the agreement information from the server;
    a setting unit that switches the information processing apparatus from a first state in which the information processing apparatus can use a specific container containing a color material to a second state in which the information processing apparatus does not use the specific container based on an elapse of a predetermined period from a time and date at which the obtaining unit fails to obtain the agreement information despite execution of the obtaining process, and
    a printing unit that executes printing using the color material contained in the specific container in a case where the information processing apparatus is operating in the first state.

2. The information processing apparatus according to claim 1, wherein the setting unit switches the information processing apparatus from the first state to the second state in a case where the obtaining unit consecutively fails to obtain the agreement information and the predetermined period elapses from the first failure among the consecutive failures.

3. The information processing apparatus according to claim 1, wherein
    the predetermined agreement information is information on an agreement period of the predetermined agreement, and
    in a case where the obtaining unit succeeds in obtaining the agreement information, the setting unit sets the information processing apparatus to the second state in a case where a current time and date is not included in the agreement period, and sets the information processing apparatus to the first state in a case where the current time and date is included in the agreement period.

4. The information processing apparatus according to claim 1, wherein
    a printing operation using the color material is restricted in a case where the information processing apparatus is in the second state and a container attached to the information processing apparatus and containing the color material is the specific container available in a predetermined service.

5. The information processing apparatus according to claim 1, wherein
    the information processing apparatus is an inkjet printing apparatus including a print head that ejects an ink according to image data, a sub tank that is used to circulate the ink between the sub tank and the print head, and a main tank that contains the ink to be supplied to the sub tank and that is detachably attached to the information processing apparatus, and
    supply of the ink from the main tank to the sub tank is restricted in a case where the information processing apparatus is in the second state and the main tank attached to the information processing apparatus is the specific main tank available in a predetermined service.

6. The information processing apparatus according to claim 1, wherein the predetermined agreement information is obtained from the server based on a user input performed on the information processing apparatus.

7. The information processing apparatus according to claim 1, wherein the server is connected to the information processing apparatus via the Internet.

8. A control method of an information processing apparatus capable of communicating with a server that saves predetermined agreement information, comprising:
    executing an obtaining process for obtaining the agreement information from the server;
    switching the information processing apparatus from a first state in which the information processing apparatus can use a specific container containing a color material to a second state in which the information processing apparatus does not use the specific container based on an elapse of a predetermined period from a time and date at which the obtaining of the agreement information fails despite execution of the obtaining process, and
    printing using the color material contained in the specific container in a case where the information processing apparatus is operating in the first state.

9. An information processing system including
    a server that saves predetermined agreement information on an information processing apparatus; and
    the information processing apparatus that is capable of communicating with the server, the information processing apparatus comprising:
        an obtaining unit that executes an obtaining process for obtaining the agreement information from the servers;
        a setting unit that switches the information processing apparatus from a first state in which the information processing apparatus can use a specific container containing a color material to a second state in which the information processing apparatus does not use the specific container based on an elapse of a predetermined period from a time and date at which the obtaining unit fails to obtain the agreement information despite execution of the obtaining process, and
        a printing unit that executes printing using the color material contained in the specific container in a case where the information processing apparatus is operating in the first state.

10. The information processing apparatus according to claim 1, wherein the specific container is a container corresponding to a predetermined print service of a subscription agreement.

11. The information processing apparatus according to claim 10, further comprising a determining unit that determines whether a container containing the color material and attached to the information processing apparatus is the specific container or a predetermined container different from the specific container and not corresponding to the predetermined print service, wherein
    the second state is a state in which a container determined to be the specific container is not used and a container determined to be the predetermined container can be used.

12. The information processing apparatus according to claim 10, further comprising a determining unit that determines whether a container containing the color material and attached to the information processing apparatus is the specific container or a predetermined container different from the specific container and not corresponding to the predetermined print service, wherein
the first state is a state in which a container determined to be the specific container and a container determined to be the predetermined container can be used.

13. The information processing apparatus according to claim 10, further comprising a determining unit that determines whether a container containing the color material and attached to the information processing apparatus is the specific container or a predetermined container different from the specific container and not corresponding to the predetermined print service, wherein
the first state is a state in which a container determined to be the specific container can be used but a container determined to be the predetermined container is not used.

* * * * *